United States Patent
Lin et al.

(10) Patent No.: US 7,242,562 B2
(45) Date of Patent: Jul. 10, 2007

(54) FAN PROTECTION METHOD AND APPARATUS

(75) Inventors: Lien-Ken Lin, Chang Hua Hsien (TW); Chun-Lung Chiu, Chang Hua Hsien (TW); Po-Tsun Kuo, Kaohsiung Hsien (TW); Wen-Shi Huang, Chung Li (TW)

(73) Assignee: Delta Electronics, Inc. (TW)

( * ) Notice: Subject to any disclaimer, the term of this patent is extended or adjusted under 35 U.S.C. 154(b) by 434 days.

(21) Appl. No.: 10/606,347

(22) Filed: Jun. 26, 2003

(65) Prior Publication Data

US 2004/0207966 A1    Oct. 21, 2004

(30) Foreign Application Priority Data

Apr. 21, 2003    (TW) ............................. 92109261 A

(51) Int. Cl.
  H02H 3/18    (2006.01)
  H02H 7/08    (2006.01)
(52) U.S. Cl. ........................................ 361/78; 318/485
(58) Field of Classification Search ................ 361/78, 361/29, 71, 72, 73, 75; 318/485
See application file for complete search history.

(56) References Cited

U.S. PATENT DOCUMENTS 3,875,463 A * 4/1975 Reuter et al. ................. 361/29
3,875,487 A * 4/1975 White ........................ 318/485
4,196,462 A * 4/1980 Pohl ............................ 361/33
4,722,019 A * 1/1988 Pohl ............................ 361/22
5,744,921 A * 4/1998 Makaran ..................... 318/254
6,301,105 B2 * 10/2001 Glorioso et al. ............ 361/685
6,893,221 B2 * 5/2005 Miller et al. .................. 416/1

FOREIGN PATENT DOCUMENTS

JP    07-287625    10/1995
JP    08-210259    8/1996
JP    11-173292    6/1999

* cited by examiner

Primary Examiner—Brian Sircus
Assistant Examiner—Boris Benenson

(57) ABSTRACT

The present invention discloses a fan protection apparatus and related method thereof. The fan protection apparatus has a control circuit and a counter. According to the fan protection method, the user can set the acceptable restart number and the special time for auto restart. The fan protection apparatus and method can force to stop the fan when the fan encounters an abnormal situation. When the stop time has passed, the fan is automatically restarted. The present invention counts the number of restarts. If the number of restarts equals the set number and the abnormal situation also cannot be eliminated, the present invention cuts off power to the fan.

8 Claims, 3 Drawing Sheets

FAN PROTECTION METHOD AND APPARATUS

FIELD OF THE INVENTION

The present invention relates to a system protection method and apparatus, and more particularly, to a fan protection method and apparatus.

BACKGROUND OF THE INVENTION

Many electrical products use a fan as the main heat sink. The fan increases the rotational speed thereof to reduce the system temperature when the system temperature is high. The fan maintains a fixed rotational speed when the system temperature is lower than a specific temperature.

Typically, a DC fan is used to avoid electrical system damage due to high temperature. The typical DC fan has a fan protection apparatus. This fan protection apparatus can force the DC fan to stop work when the fan meets an abnormal situation. For example, a foreign material locks the DC fan. After a specific time interval, the protection apparatus restarts the DC fan and checks whether or not the DC fan is still locked by the foreign material. The protection apparatus forces the DC fan to stop again if the abnormal situation still exists. Then, the protection apparatus restarts the DC fan again after a specific time again passes. In other words, the typical fan protection apparatus performs a repeating loop of stopping the fan and restarting the fan to avoid the abnormal situation.

However, the typical fan protection apparatus and method have many problems. First, the conventional fan protection apparatus and method lacks a standard for determining whether the abnormal situation can be eliminated. Therefore, the stop/restart loop will be continually performed if the abnormal situation still exists in the fan, which may break the fan. In other words, the DC fan will not be shut down even though the abnormal situation cannot be eliminated. Second, a larger restart current is required to start the DC fan. The larger restart current causes an unstable electrical system in the stop/restart process.

SUMMARY OF THE INVENTION

Therefore, it is a main object of the present invention to provide a fan protection apparatus and method that has a shutdown DC fan determination standard. Therefore, it can avoid continually performing the stop/restart process to break the DC fan.

It is another object of the present invention to provide a fan protection apparatus and method that can shut down the DC fan when the abnormal situation cannot be eliminated.

It is yet another object of the present invention to provide a fan protection apparatus and method that can avoid the continual performance of the stop/restart process to cause an unstable electrical system.

Therefore, the present invention provides a fan protection apparatus and method. According to the present invention, the user can set the number for restarting the fan and the stop time of the fan in a stop state. In accordance with the present invention, the fan protection apparatus and method can force the fan to stop when the fan encounters an abnormal situation. When the stop time is passed, the fan is automatically restarted. The present invention counts the number of restart times. If the number of restart times meets the set number and the abnormal situation also cannot be eliminated, the present invention cuts off the power to the fan.

Therefore, in accordance with the present invention, the continual performance of the stop/restart process to break the fan can be avoided. Moreover, the continual performance to cause an unstable electrical system can also be avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Without limiting the spirit and scope of the present invention, the fan protection apparatus and method proposed in the present invention is illustrated with one preferred embodiment. One with ordinary skill in the art, upon acknowledging the embodiment, can apply the protection apparatus and method of the present invention to various electrical systems. In accordance with the present invention, it can shutdown the DC fan when the abnormal situation cannot be eliminated. Therefore, it can avoid continually performing the stop/restart process to break the DC fan. Moreover, it can avoid continually performing the stop/restart process to cause an unstable electrical system. The application of the present invention is not limited by the preferred embodiments described in the following.

Figure 1:
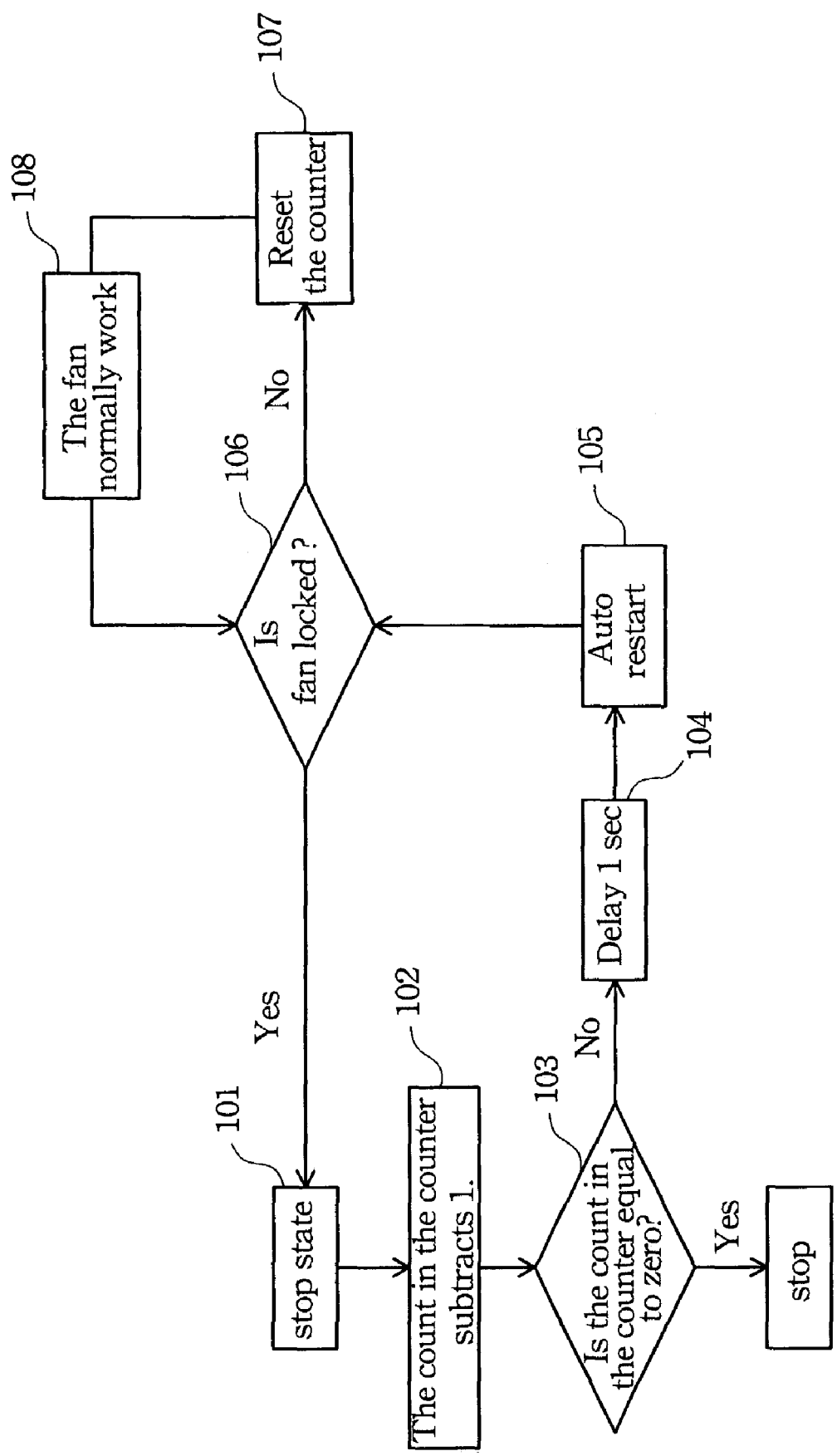
FIG. 1 illustrates a flow chart of a fan protection method in accordance with the first embodiment of the present invention.

FIG. 1 illustrates a flow chart of a fan protection method in accordance with the first embodiment of the present invention. The present invention uses a counter to determine whether or not the abnormal situation is eliminated.

First, the fan protection apparatus can force the fan to stop when the fan encounters an abnormal situation. For example, a foreign material locks the fan. At this time, the fan is in a stop state in step 101. The time of the fan to stay stopped can be set by the users. Next, in the step 102, a counter used to count the number of times of the fan is stopped in accordance with the present invention. According to the present invention, the counting process can be finished by subtracting 1 from the set count in the counter. The set count that can be set by the users represents the acceptable number of fan resets. Step 103 determines whether or not the number of times of the fan has been stopped is equal to the number of times of the set count, that is, whether or not the count in the counter has been subtracted to zero is checked.

A count equal to zero means that the number of times of the fan is forced to stop has reached to the set number. At this time, the protection apparatus determines that the abnormal situation existing in the fan cannot be eliminated. As a result, it cuts off power to the fan.

On the other hand, a count not equal to zero means that the number of times of the fan is forced to stop has not reached the set number. At this time, the protection apparatus commands the fan to stop about 1 second as shown in step 104. It is noted that the stop time can be set by the users.

Then, in the step 105, the protection apparatus restarts the fan again. In the step 106, a determination process is performed again. In this step, the protection apparatus determines whether or not the abnormal situation existing in the fan has been eliminated. That is to determine whether or not the fan is locked. Step 101 is performed again if the fan is still locked.

On the other hand, step 107 is performed if the fan can work normally, that is, the fan is not locked. Therefore, the fan may work in a normal speed and consume normal current so that a fan motor has a normal temperature. At this time, the counter is reset in and the fan keeps working in step 108. Next, returning to step 106, the determination process is performed again. Similarly, step 101 is performed again if the fan is locked. Otherwise, step 107 and step 108 are performed.

Figure 2:
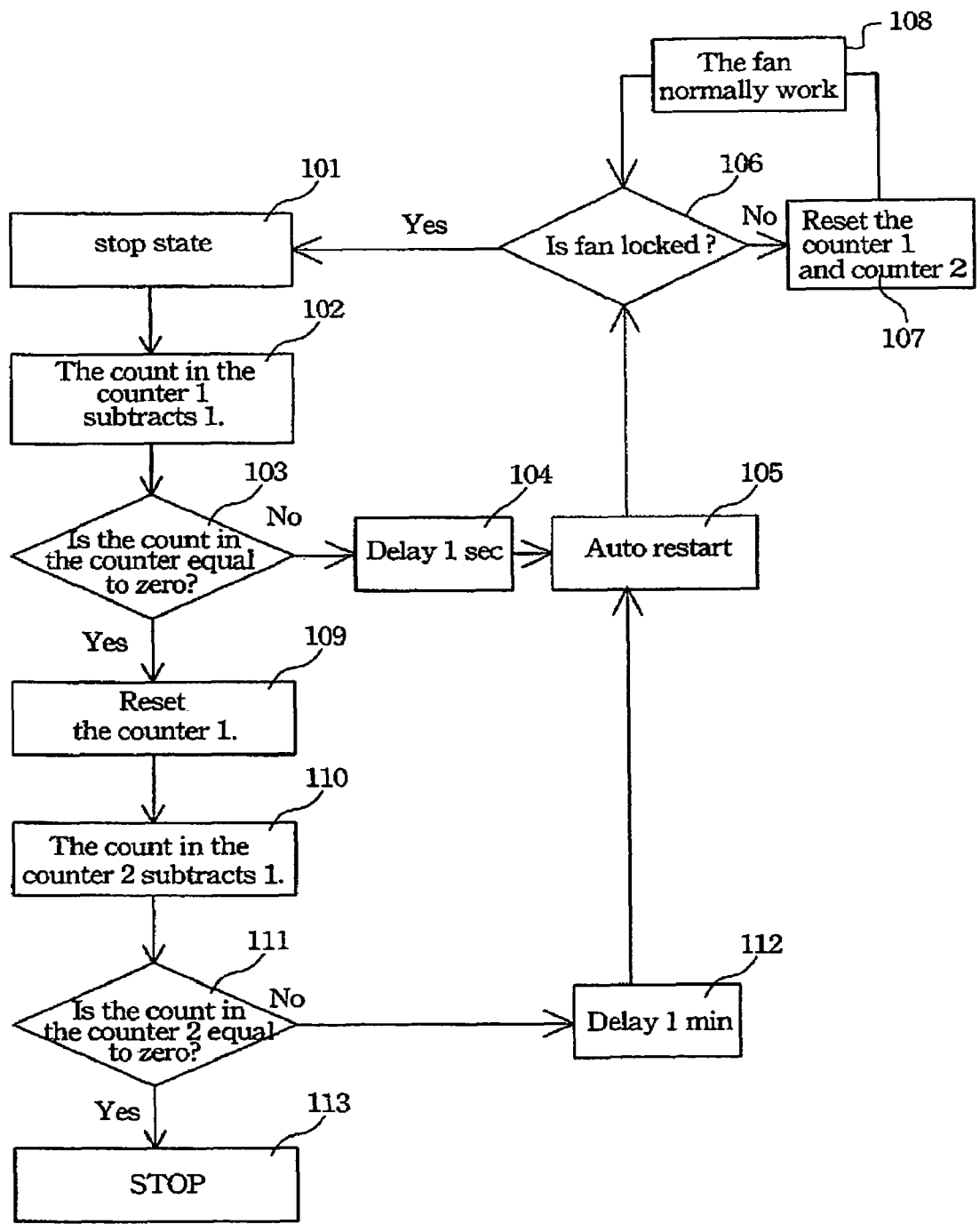
FIG. 2 illustrates a flow chart of a fan protection method in accordance with the second embodiment of the present invention.

It is noted that the flow chart shown in the first embodiment can be expanded. In other words, a plurality of the first embodiments can be combined together to improve the performance. FIG. 2 illustrates a flow chart of a fan protection method in accordance with the second embodiment of the present invention. Two counters are used in the second embodiments to determine whether or not the abnormal situation cannot be eliminated.

First, the fan protection apparatus can force the fan to stop work when the fan meets an abnormal situation. For example, a foreign material locks the fan. At this time, the fan is stopped in step 101. The time the fan stays stopped can be set by the users. Next, in step 102, a first counter is used to count the number of times of the fan stays stopped in accordance with the present invention. According to the present invention, the counting process can be finished by subtracting 1 from the set count in the first counter. The set count can be set by users and represents the acceptable number of times of fan restarts. Step 103 determines whether or not the number of times of the fan stops is equal to the number of times of the set count. That is, whether or not the count in the first counter has been subtracted to zero is checked.

Step 104 is performed if the count in the first counter is not equal to zero. At this time, the protection apparatus commands the fan to stop for about 1 second. It is noted that the time can be set by the users. Then, the protection apparatus restarts the fan in step 105. In the step 106, a determination process is performed again to determine whether or not the abnormal situation existing in the fan has been eliminated. That is, whether or not the fan is locked is determined. Step 101 is performed again if the fan is still locked.

On the other hand, step 107 is performed to reset the first counter and the second counter (described in the following) if the fan is not locked. Then, the fan keeps working in step 108. That is the fan may work in a normal speed and consume normal current so that a fan motor has a normal temperature. Next, returning to step 106, the determination process is performed again. Similarly, step 101 is performed again if the fan is locked. Otherwise, steps 107 and 108 are performed to make the fan work normally. The set count in the first counter can determine the loop repeat number from steps 101 to 108. For example, the maximum loop repeat number is 10 if the user sets the count in the first counter to 10. Therefore, step 109 is performed if the abnormal situation exiting in the fan has still not been eliminated after performing the loop 10 times from steps 101 to 108. The first counter is reset in step 109.

The present invention makes the fan stay stopped for a long time if the abnormal situation exiting in the fan has still not been eliminated after performing the loop from steps 101 to 108 10 times. It is noted that the time can be set by the user. In step 110, a second counter is used to count the number of times the fan stays stopped. According to the present invention, the counting process can be finished by subtracting 1 from the set count in the second counter. The set count can be set by users and represents the acceptable number of times that the fan can stay stopped. Next, step 111 determines whether or not the number of times of the fan stays stopped is equal to the set count. That is, whether or not the count in the second counter has been subtracted to zero is checked.

Step 112 is performed if the count in the second counter is not equal to zero. At this time, the protection apparatus controls the fan to stop for about 1 minute. It is noted that the time can be set by the users. Then, the protection apparatus restarts the fan in step 105. On the other hand, the protection apparatus cuts off power to the fan in step 113 if the count in the second counter is equal to zero.

After step 105, step 106 is performed again to determine whether or not the abnormal situation existing in the fan has been eliminated. That is, whether or not the fan is still locked is determined. Step 101 is performed again if the fan is still locked. On the other hand, step 107 is performed to reset the first counter and the second counter if the fan is not locked. Then, the fan keeps working in step 108. Next, returning to step 106, the determination process is performed again. Similarly, step 101 is performed again if the fan is locked. Otherwise, steps 107 and 108 are performed to make the fan work normally.

In other words, the second embodiment of the present invention can repeat the loop from steps 101 to 108 after the fan is restarted in step 105. If the loop repeat number reaches the set count in the first counter and the abnormal situation existing in the fan has not been eliminated, the first counted is reset again. Next, step 109 is performed to subtract 1 from the count in the second counter. Step 111 checks whether or not the count in the second counter has been subtracted to zero. If the count in the second counter is equal to zero, the protection apparatus cuts off power to the fan in step 113. Otherwise, steps 101 to 112 are performed again. Therefore, if the count in the first counter is 6, the restart time is 10 seconds, the count in the second counter is 10 and the restart time is 1 minute, the protection apparatus cuts off power to the fan if the abnormal situation existing in the fan cannot be eliminated after 20 minutes.

According to the above description, the present invention can provide a shutdown fan determination standard. Therefore, it can avoid continually performing the stop/restart process to break the DC fan. On the other hand, the present invention also can avoid the continual performance of the stop/restart process to cause an unstable electrical system. It is noted that a plurality of the first embodiments can be combined together to form different protection methods.

Figure 3:
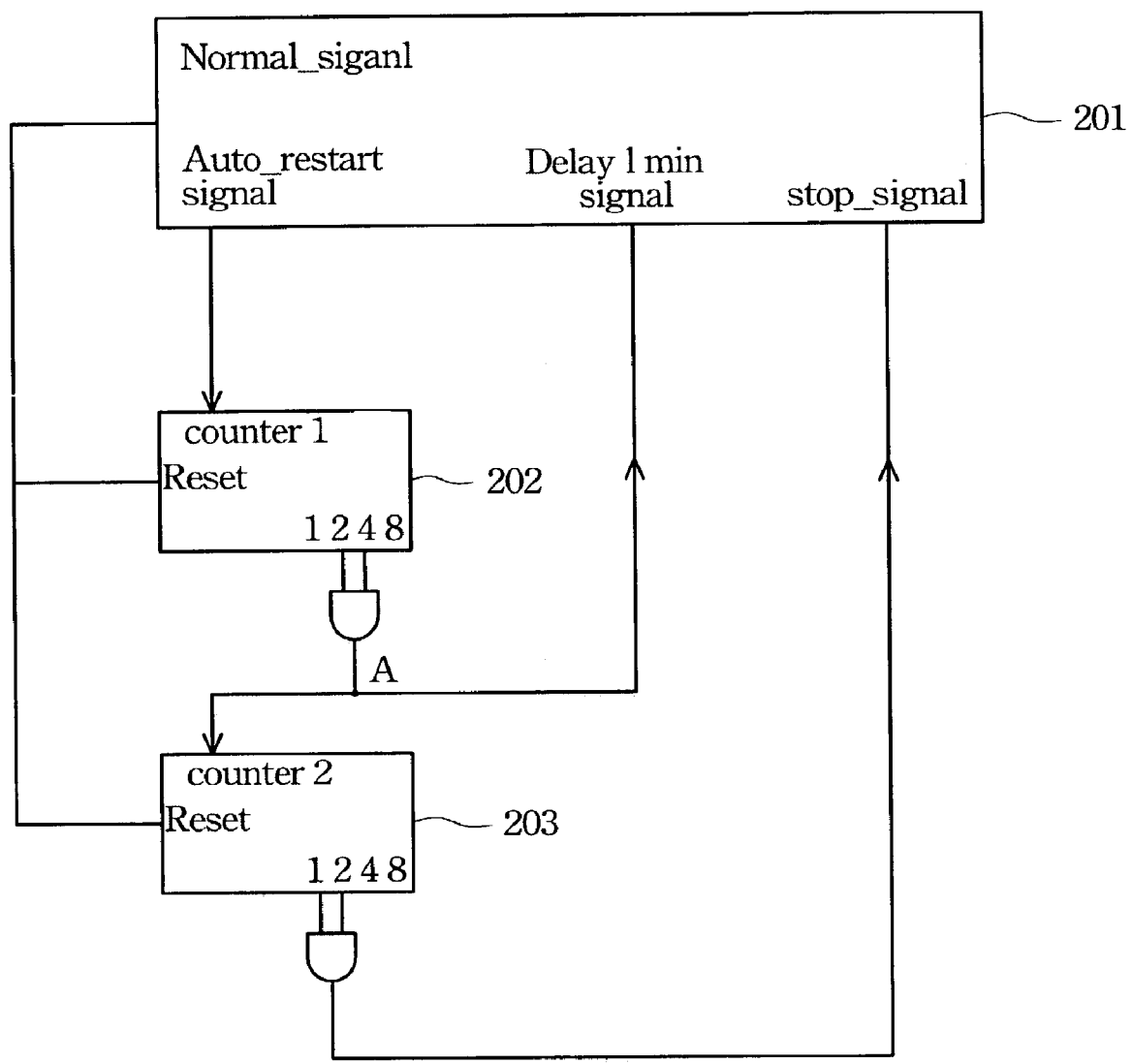
FIG. 3 illustrates a schematic drawing of the protection apparatus of the present invention.

FIG. 3 illustrates a schematic drawing of the protection apparatus of the present invention. First, the control IC 201 can force the fan to stop work when the fan meets an abnormal situation. The control IC 201 can send an auto-restart signal to the first counter 202 when the stop time of the fan reaches the set value. Next, the signal in the A point will become a high level signal when the auto-restart number counted by the first counter reaches the set value. This high level signal is used as a trigger signal for the second counter 203. On the other hand, this signal is also sent to the control IC 201 to generate a delay signal to the fan. The fan will stop work when it receives the delay signal. Next, the control IC 201 sends a restart signal to restart the fan again.

On the other hand, a stop signal will be triggered to cut off the power supplied to the fan when the second counter 203 counts the set number. Contrarily, if the abnormal situation existing in the fan has been eliminated during counting process, the control IC 201 will send a normal signal to reset the first counter 202 and the second counter 203.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A fan protection method for protecting a fan when said fan is locked, said method using a first counter for counting a first stopping number and a second counter for counting a second stopping number, said method comprising steps of:
    stopping transferring a drive signal to said fan to stop said fan for a first time period;
    determining whether or not a number of stops is equal to the first stopping number counted by the first counter:
    restarting said fan when said number of stops is not equal to said first stopping number wherein said drive signal is transferred to said fan again to restart said fan;
    stopping transferring said drive signal to said fan to stop said fan for a second time period when said number of stops is equal to said first stopping number or repeating above steps when said number of stops is not equal to said first stopping number;
    restarting said fan, wherein said drive signal is transferred to said fan again to restart said fan;
    determining whether or not the number of stops is equal to the second stopping number counted by the second counter;
    cutting off power without restoring power thereafter to said fan when said number of stops is equal to said second stopping number; and
    repeating the above steps when said number of stops is not equal to said second stopping number.

2. The fan protection method according to claim 1, wherein said first time period and said second time period are set by a user.

3. The fan protection method according to claim 1, wherein said first stopping number and said second stopping number are set by a user.

4. The fan protection method according to claim 1, wherein further comprises making said fan keep working when said fan is able to work normally and reselling said first stopping number.

5. The fan protection method according to claim 1, wherein further comprises making said fan keep working when said fan is able to work normally.

6. A fan protection apparatus for protecting a fan when said fan is locked, wherein said apparatus sets a first stopping number and a second stopping number for stopping the fan, said apparatus comprising:
    a control circuit for stopping said fan or starting said fan; and
    a first counter connected to said control circuit for counting a number of fan stops, wherein a control signal is generated when said number of fan stops is equal to said first stopping number and said control signal is transferred to said control circuit to stop said fan for a first time period; and
    a second counter connected to said first counter for receiving said control signal, wherein said second counter counts the number of times of stopping said fan for the first time period, and said control circuit cuts off power to said fan when said number of times of stopping said fan for a second time period is equal to said second stopping number.

7. The fan protection apparatus according to claim 6, wherein said first time, said first stopping number, and said second stopping number are set by a user.

8. The fan protection apparatus according to claim 6, wherein said control circuit sends a reset signal to reset said first and said second counter when said fan is able to work normally.

* * * * *